(12) United States Patent
Yamamoto et al.

(10) Patent No.: US 7,229,713 B2
(45) Date of Patent: Jun. 12, 2007

(54) ELECTRODE AND BATTERY USING THE SAME

(75) Inventors: Takeru Yamamoto, Kanagawa (JP); Gentaro Kano, Fukushima (JP); Hiroyuki Akashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 10/486,049

(22) PCT Filed: Jun. 18, 2003

(86) PCT No.: PCT/JP03/07702

§ 371 (c)(1), (2), (4) Date: Feb. 6, 2004

(87) PCT Pub. No.: WO04/001880

PCT Pub. Date: Dec. 31, 2003

(65) Prior Publication Data

US 2004/0185341 A1    Sep. 23, 2004

(30) Foreign Application Priority Data

Jun. 20, 2002  (JP) ............................. 2002-180197

(51) Int. Cl.
*H01M 4/02* (2006.01)
*H01M 10/40* (2006.01)

(52) U.S. Cl. ...................................... 429/209; 429/338

(58) Field of Classification Search ...................... None
See application file for complete search history.

(56) References Cited

U.S. PATENT DOCUMENTS 6,884,546 B1 * 4/2005 Fujita et al. .............. 429/231.9
2003/0147800 A1 * 8/2003 Kwon et al. ............ 423/445 R

FOREIGN PATENT DOCUMENTS

| EP | 495613 A2 | 7/1992 |
|----|-----------|--------|
| JP | 06-60877  | 3/1994 |
| JP | 07-105935 | 4/1995 |
| JP | 07-105940 | 4/1995 |
| JP | 08-293323 | 11/1996 |

(Continued)

*Primary Examiner*—Dah-Wei Yuan
*Assistant Examiner*—Karie O'Neill
(74) *Attorney, Agent, or Firm*—Sonnenschein Nath & Rosenthal LLP

(57) ABSTRACT

Provided are an electrode and a battery having superior charge-discharge cycle characteristics and capable of obtaining a higher energy density. The battery comprises a spirally wound electrode body (20) including a cathode (21) and an anode (22) spirally wound with a separator (23) in between. During charge, lithium metal is precipitated on the anode (22), so the capacity of the anode (22) is represented by the sum of a capacity component by insertion and extraction of lithium and a capacity component by precipitation and dissolution of the lithium metal. The anode (22) includes a mixture layer (22b) having a powdered anode active material, and the mixture layer (22b) has liquid absorption properties that when 1 μdm$^3$ of propylene carbonate is dropped on the mixture layer (22b) at 23° C., a contact angle that the mixture layer (22b) forms with a propylene carbonate drop becomes 10 degrees within 100 seconds. Thereby, the mixture layer (22b) is impregnated with an electrolyte solution quickly and uniformly, so lithium metal is uniformly precipitated on the whole mixture layer (22b).

7 Claims, 5 Drawing Sheets

FOREIGN PATENT DOCUMENTS

| | | |
|---|---|---|
| JP | 09-213372 | 8/1997 |
| JP | 2000-12035 | 1/2000 |
| JP | 2000-58039 | 2/2000 |
| JP | 2001-351627 | 12/2001 |
| JP | 2002-56896 | 2/2002 |
| JP | 2002083587 A * | 3/2002 |
| JP | 2002-260636 | 9/2002 |

* cited by examiner

ELECTRODE AND BATTERY USING THE SAME

BACKGROUND OF THE INVENTION

The present invention relates to a battery comprising a cathode, an anode and an electrolyte solution, and an electrode used in the battery.

In recent years, reduction in size and weight of portable electric devices typified by cellular phones, PDAs (personal digital assistants) or laptop computers has been vigorously pursued, and as part of the reduction, an improvement in energy density of batteries, specifically secondary batteries as power sources for the devices has been strongly required.

One example of a secondary battery which can obtain a high energy density is a lithium-ion secondary battery using a material capable of inserting and extracting lithium (Li) such as a carbon material for an anode. The lithium-ion secondary battery is designed so that lithium inserted into an anode material is always in an ion state, so the energy density is highly dependent on the number of lithium ions capable of being inserted into the anode material. Therefore, in the lithium-ion secondary battery, it is expected that when the amount of insertion of lithium is increased, the energy density can be further improved. However, the amount of insertion of graphite, which is considered at present to be a material capable of the most effectively inserting and extracting lithium ions is theoretically limited to 372 mAh per gram on an electricity amount basis, and recently the amount of insertion of graphite has been approaching the limit by active development.

Another example of the secondary battery capable of obtaining a high energy density is a lithium secondary battery using lithium metal for an anode, and using only precipitation and dissolution reactions of lithium metal for an anode reaction. In the lithium secondary battery, a theoretical electrochemical equivalent of the lithium metal is as large as 2054 mAh/cm$^3$, which is 2.5 times larger than that of graphite used in the lithium-ion secondary battery, so it is expected that the lithium secondary battery can obtain a much higher energy density than the lithium-ion secondary battery. A large number of researchers have been conducting research and development aimed at putting the lithium secondary battery to practical use (for example, Lithium Batteries edited by Jean-Paul Gabano, Academic Press, 1983, London, N.Y.).

However, the lithium secondary battery has a problem that when a charge-discharge cycle is repeated, a large decline in its discharge capacity occurs, so it is difficult to put the lithium secondary battery to practical use. The decline in the capacity occurs because the lithium secondary battery uses precipitation-dissolution reactions of the lithium metal in the anode. In accordance with charge and discharge, the volume of the anode largely increases or decreases by the amount of the capacity corresponding to lithium ions transferred between the cathode and the anode, so the volume of the anode is largely changed, thereby it is difficult for a dissolution reaction and a recrystallization reaction of a lithium metal crystal to reversibly proceed. Further, the higher energy density the lithium secondary battery achieves, the more largely the volume of the anode is changed, and the more pronouncedly the capacity declines. Moreover, falling off of precipitated lithium, or a loss of the precipitated lithium because the lithium forms a coating with an electrolyte solution is considered as a cause of the decline in the capacity.

Therefore, the applicant of the invention have developed a novel secondary battery in which the capacity of the anode includes a capacity component by insertion and extraction of lithium and a capacity component by precipitation and dissolution of lithium, and is represented by the sum of them (refer to International Publication No. WO 01/22519 A1). In the secondary battery, a carbon material capable of inserting and extracting lithium is used for the anode, and lithium is precipitated on a surface of the carbon material during charge. The secondary battery holds promise of improving charge-discharge cycle characteristics while achieving a higher energy density.

However, like the lithium secondary battery, the secondary battery uses precipitation-dissolution reactions of lithium, so the secondary battery has a problem that when a charge-discharge cycle is repeated, a larger decline in the discharge capacity occurs, compared to the lithium-ion secondary battery. In order to overcome the problem, it is considered that it is important to uniformly precipitate lithium on the whole anode. For the purpose, it is required to contrive the structure of the anode.

In a conventional lithium-ion secondary battery, a large number of structural contrivances for improving characteristics have been reported. For example, in Japanese Unexamined Patent Application Publication No. Hei 10-270016, a method of improving liquid absorption speed in a surface of an electrode through forming a continuous shallow groove on the surface of the electrode is reported, and in Japanese Unexamined Patent Application Publication No. Hei 10-97863, a method of improving liquid absorption speed of an electrode through setting porosity of the electrode.

However, in the method disclosed in Japanese Unexamined Patent Application Publication No. Hei 10-270016, the liquid absorption speed in the surface of the electrode can be improved, but it is difficult to improve liquid absorption speed in the whole electrode, thereby it is difficult to obtain sufficient characteristics. Further, in the method disclosed in Japanese Unexamined Patent Application Publication No. Hei 10-97863, the liquid absorption speed of the electrode can be improved, but the volume density of the electrode is sacrificed, so it is difficult to obtain a high energy density.

In view of the foregoing, it is an object of the invention to provide an electrode and a battery both having superior charge-discharge cycle characteristics and capable of obtaining a higher energy density.

SUMMARY OF THE INVENTION

An electrode according to the invention comprises: a mixture layer including a powdered electrode active material, wherein the mixture layer has liquid absorption properties that when 1 μdm$^3$ of propylene carbonate is dropped on the mixture layer at 23° C., a contact angle that the mixture layer forms with a propylene carbonate drop becomes 10 degrees or less within 100 seconds.

A battery according to the invention comprises: a cathode; an anode; and an electrolyte solution, wherein at least either the cathode or the anode comprises: a mixture layer including a powdered electrode active material, wherein the mixture layer has liquid absorption properties that when 1 μdm$^3$ of propylene carbonate is dropped on the mixture layer at 23° C., a contact angle that the mixture layer forms with a propylene carbonate drop becomes 10 degrees or less within 100 seconds.

In the electrode and the battery according to the invention, the mixture layer of the electrode has the liquid absorption properties that when 1 μdm³ of propylene carbonate is dropped on the mixture layer at 23° C., the contact angle that the mixture layer forms with the propylene carbonate drop becomes 10 degrees within 100 seconds, so the mixture layer is impregnated with the electrolyte solution quickly and uniformly. Therefore, superior charge-discharge cycle characteristics and a higher energy density can be obtained.

DETAILED DESCRIPTION OF THE PRESENTLY PREFERRED EMBODIMENTS

Preferred embodiments of the invention will be described in more detail below referring to the accompanying drawings.

Figure 1:
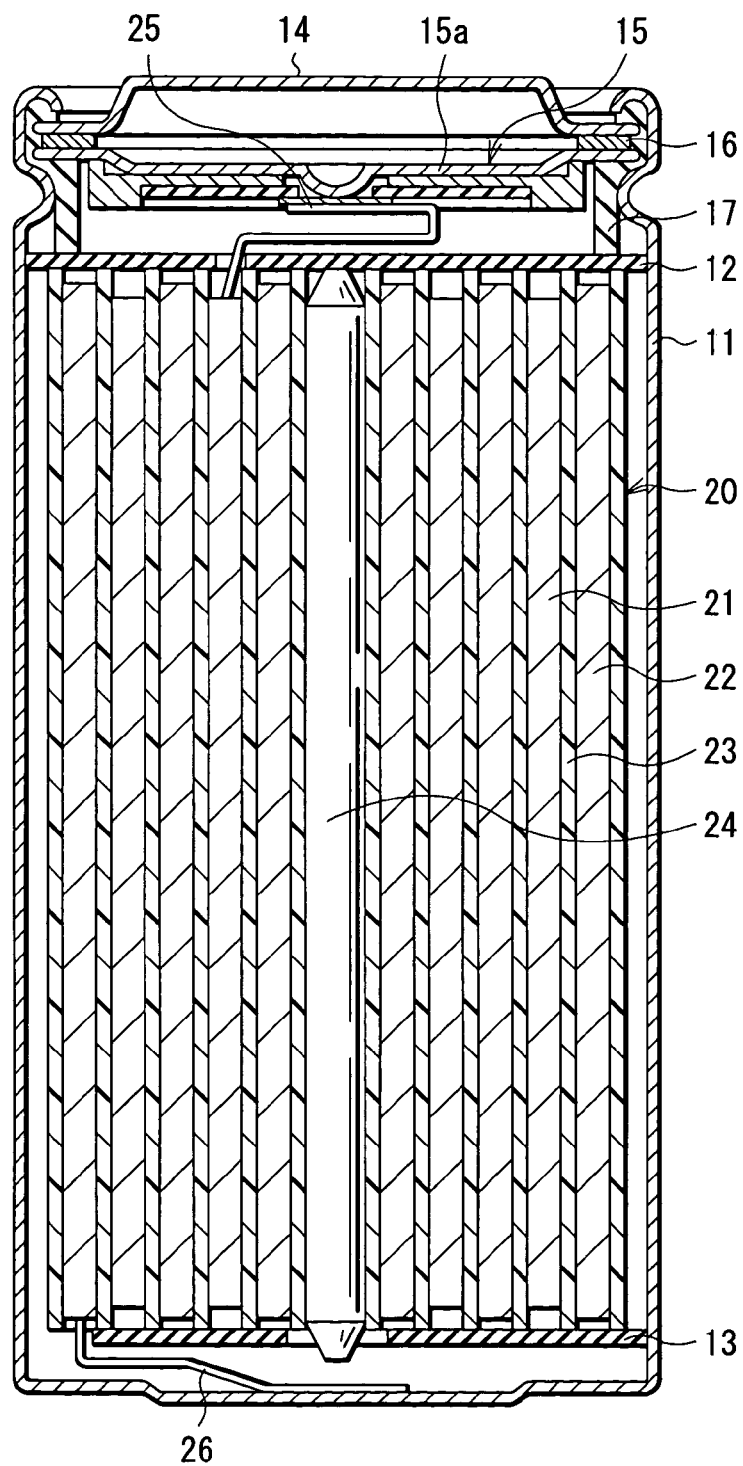
FIG. 1 is a sectional view of a secondary battery according to an embodiment of the invention.

FIG. 1 shows a sectional view of a secondary battery according to an embodiment of the invention. The secondary battery is a so-called cylindrical type, and comprises a spirally wound electrode body 20 including a strip-shaped cathode 21 and a strip-shaped anode 22 spirally wound with a separator 23 in between in a substantially hollow cylindrical-shaped battery can 11. The battery can 11 is made of, for example, nickel (Ni)-plated iron (Fe). An end portion of the battery can 11 is closed, and the other end portion thereof is opened. An electrolyte solution is injected into the battery can 11 to impregnate the separator 23 with the electrolyte solution. Moreover, a pair of insulating plates 12 and 13 are disposed so that the spirally wound electrode body 20 is sandwiched therebetween in a direction perpendicular to a spirally wound peripheral surface.

In the opened end portion of the battery can 11, a battery cover 14 and, a safety valve mechanism 15 and a PTC device (positive temperature coefficient device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15a is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current.

The PTC device 16 is made of, for example, barium titanate semiconductor ceramic. The gasket 17 is made of, for example, an insulating material, and its surface is coated with asphalt.

The spirally wound electrode body 20 is wound around, for example, a center pin 24. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
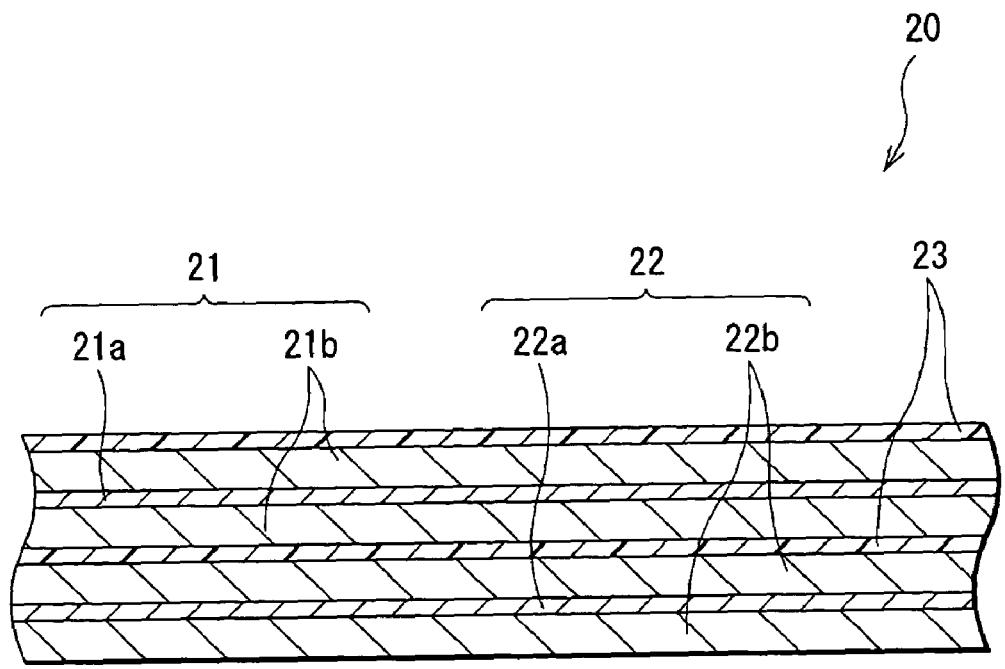
FIG. 2 is an enlarged sectional view of a part of a spirally wound electrode body in the secondary battery shown in FIG. 1.

FIG. 2 shows an enlarged view of a part of the spirally wound electrode body 20 shown in FIG. 1. The cathode 21 has, for example, a structure in which a mixture layer 21b is disposed on both sides of a current collector 21a having a pair of surfaces facing each other. In addition, the mixture layer 21b may be disposed on only one side of the current collector 21a, although it is not shown. The current collector 21a is made of, for example, metal foil such as aluminum foil, nickel foil or stainless foil with a thickness of approximately from 5 μm to 50 μm. The mixture layer 21b has, for example, a thickness of 80 μm to 250 μm, and includes a cathode active material as an electrode active material. Further, when the mixture layer 21b is disposed on both sides of the current collector 21a, the thickness of the mixture layer 21b means the total thickness thereof.

The mixture layer 21b requires to include a lithium content equal to a charge-discharge capacity of 280 mAh or over per gram of an anode active material, which will be described later, in a steady state (for example, after a charge-discharge cycle is repeated 5 times or so), and more preferably to include a lithium content equal to a charge-discharge capacity of 350 mAh or over per gram of the anode active material. Therefore, as the cathode active material, a compound including lithium such as lithium oxide, lithium sulfide or an intercalation compound including lithium is suitable, and a mixture including two or more kinds selected from them may be used. More specifically, in order to achieve a higher energy density, a lithium complex oxide or an intercalation compound including lithium represented by a general formula $Li_xMO_2$ is preferable. In the formula, as M, one or more kinds of transition metals, more specifically at least one kind selected from the group consisting of cobalt (Co), nickel, manganese (Mn), iron, aluminum, vanadium (V) and titanium (Ti) is preferable. The value of x depends upon a charge-discharge state of the battery, and is generally within a range of $0.05 \leq x \leq 1.10$. In addition, $LiMn_2O_4$ having a spinel crystal structure, $LiFePO_4$ having an olivine crystal structure, or the like is preferable, because a higher energy density can be obtained.

It is not necessarily required to supply lithium from the cathode active material, and, for example, lithium may be supplied through bonding lithium metal or the like to the anode 22 to add lithium ions in the battery. In other words, a lithium content equal to a charge-discharge capacity of 280 mAh or over per gram of the anode active material may be included in a battery system. The lithium content in the battery system can be determined through measuring the discharge capacity of the battery.

The above cathode active material is prepared through the following steps. For example, after a carbonate, a nitrate, an oxide or a hydroxide including lithium, and a carbonate, a nitrate, an oxide or a hydroxide including a transition metal are mixed so as to have a desired composition, and the mixture is pulverized, the pulverized mixture is fired at a temperature ranging from 600° C. to 1000° C. in an oxygen atmosphere, thereby the cathode material is prepared.

The mixture layer 21b includes, for example, an electronic conductor, and may further include a binder, if necessary. Examples of the electronic conductor include carbon materials such as graphite, carbon black and ketjen black, and one kind or a mixture of two or more kinds selected from them is used. In addition to the carbon materials, any electrically conductive material such as a metal material or a conductive high molecular weight material may be used. Examples of the binder include synthetic rubber such as styrene butadiene rubber, fluorine rubber or ethylene propylene diene rubber, or a high molecular weight material such as polyvinylidene fluoride, and one kind or a mixture including two or more kinds selected from them is used.

Like the cathode 21, the anode 22 has, for example, a structure in which a mixture layer 22b is disposed on both sides of a current collector 22a having a pair of surfaces facing each other. The mixture layer 22b may be disposed on only one side of the current collector 22a, although it is not shown. The current collector 22a is made of, for example, metal foil having excellent electrochemical stability, electric conductivity and mechanical strength such as copper foil, nickel foil or stainless foil.

The mixture layer 22b includes an anode active material as a powdered electrode active material, and may further include, for example, the same binder as that included in the mixture layer 21b, if necessary. The mixture layer 22b has a thickness of, for example, 60 μm to 250 μm. When the mixture layer 22b is disposed on both sides of the current collector 22a, the thickness of the mixture layer 22b means the total thickness thereof.

As the powdered anode active material, an anode material capable of inserting and extracting lithium as light metal is cited. In the description, insertion and extraction of light metal mean that light metal ions are electrochemically inserted and extracted without losing their ionicity. It includes not only the case where inserted lithium metal exists in a perfect ion state but also the case where the inserted lithium metal exists in an imperfect ion state. These cases include, for example, insertion by electrochemical intercalation of light metal ions into graphite. Further, insertion of the light metal into an alloy including an intermetallic compound, or insertion of the light metal by forming an alloy can be included.

As the anode material capable of inserting and extracting lithium, for example, a carbon material such as graphite, non-graphitizable carbon or graphitizing carbon is used. These carbon materials are preferable, because a change in the crystalline structure which occurs during charge and discharge is extremely small, so a higher charge-discharge capacity and superior charge-discharge cycle characteristics can be obtained. Further, graphite is more preferable, because its electrochemical equivalent is large, and a higher energy density can be obtained.

For example, graphite with a true density of 2.10 g/cm$^3$ or over is preferable, and graphite with a true density of 2.18 g/cm$^3$ or over is more preferable. In order to obtain such a true density, a c-axis crystalline thickness of a (002) plane is required to be 14.0 nm or over. Moreover, the spacing of (002) planes is preferably less than 0.340 nm, and more preferably within a range from 0.335 nm to 0.337 nm.

The graphite may be natural graphite or artificial graphite. The artificial graphite can be obtained through the following steps, for example. An organic material is carbonized, and high-temperature heat treatment is carried out on the carbonized organic material, then the organic material is pulverized and classified so as to obtain the artificial graphite. The high-temperature treatment is carried out in the following steps. For example, the organic material is carbonized at 300° C. to 700° C. in an airflow of an inert gas such as nitrogen ($N_2$), if necessary, and then the temperature rises to 900° C. to 1500° C. at a rate of 1° C. to 100° C. per minute, and the temperature is kept for 0 to 30 hours to calcine the organic material, then the organic material is heated to 2000° C. or over, preferably 2500° C. or over, and the temperature is kept for an adequate time.

As the organic material as a starting material, coal or pitch can be used. Examples of the pitch include a material which can be obtained by distillation (vacuum distillation, atmospheric distillation or steam distillation), thermal polycondensation, extraction, and chemical polycondensation of tars which can be obtained by thermally cracking coal tar, ethylene bottom oil, crude oil or the like at high temperature, asphalt or the like, a material produced during carbonization of wood, a polyvinyl chloride resin, polyvinyl acetate, polyvinyl butyrate, or a 3,5-dimethylphenol resin. These coals and pitches exist in a liquid state around at 400° C. at the highest during carbonization, and by keeping the coals and pitches at the temperature, aromatic rings are condensed and polycycled, so the aromatic rings are aligned in a stacking arrangement. After that, a solid carbon precursor, that is, semi-coke is formed at approximately 500° C. or over (liquid-phase carbonization process).

Moreover, as the organic material, a condensed polycyclic hydrocarbon compound such as naphthalene, phenanthrene, anthracene, triphenylene, pyrene, perylene, pentaphene or pentacene, a derivative thereof (for example, carboxylic acid of the above compound, carboxylic acid anhydride, carboxylic acid imide), or a mixture thereof can be used. Further, a condensed heterocyclic compound such as acenaphthylene, indole, isoindole, quinoline, isoquinoline, quinoxaline, phthalazine, carbazole, acridine, phenazine and phenanthridine, a derivative thereof, or a mixture thereof can be used.

In addition, pulverization may be carried out before or after carbonization and calcination, or during a rise in temperature before graphitization. In these cases, the material in powder form is heated for graphitization in the end. However, in order to obtain graphite powder with a higher bulk density and a higher fracture strength, it is preferable that after the material is molded, the molded material is heated, then the graphitized molded body is pulverized and classified.

For example, in order to form the graphitized molded body, after coke as a filler and binder pitch as a molding agent or a sintering agent are mixed and molded, a firing step in which the molded body is heated at a low temperature of 1000° C. or less and a step of impregnating the fired body with the molten binder pitch are repeated several times, and then the body is heated at high temperature. The binder pitch with which the fired body is impregnated is carbonized by the above heat treatment process so as to be graphitized. In this case, the filler (coke) and the binder pitch are used as the materials, so they are graphitized as a polycrystal, and sulfur or nitrogen included in the materials is generated as a gas during the heat treatment, thereby minute pores are formed in a path of the gas. Therefore, there are some advantages that insertion and extraction of lithium proceed more easily by the pores, and industrial processing efficiency is higher. Further, as the material of the molded body, a filler having moldability and sinterability may be used. In this case, the binder pitch is not required.

The non-graphitizable carbon having the spacing of the (002) planes of 0.37 nm or over and a true density of less than 1.70 g/cm$^3$, and not showing an exothermic peak at 700° C. or over in a differential thermal analysis (DTA) in air is preferable.

Such non-graphitizable carbon can be obtained, for example, through heating the organic material around at 1200° C., and pulverizing and classifying the material. Heat treatment is carried out through the following steps. After, if necessary, the material is carbonized at 300° C. to 700° C. (solid phase carbonization process), a temperature rises to 900° C. to 1300° C. at a rate of 1° C. to 100° C. per minute, and the temperature is kept for 0 to 30 hours. Pulverization may be carried out before, or after carbonization or during a rise in temperature.

As the organic material as a starting material, for example, a polymer or a copolymer of furfuryl alcohol or furfural, or a furan resin which is a copolymer including macromolecules thereof and any other resin can be used. Moreover, a conjugated resin such as a phenolic resin, an acrylic resin, a vinyl halide resin, a polyimide resin, a polyamide imide resin, a polyamide resin, polyacetylene or polyparaphenylene, cellulose or a derivative thereof, coffee beans, bamboos, crustacea including chitosan, kinds of bio-cellulose using bacteria can be used. Further, a compound in which a functional group including oxygen (O) is introduced into petroleum pitch with, for example, a ratio H/C of the number of atoms between hydrogen (H) and carbon (C) of from 0.6 to 0.8 (that is, an oxygen cross-linked compound) can be used.

The oxygen content in the compound is preferably 3% or over, and more preferably 5% or over (refer to Japanese Unexamined Patent Application Publication No. Hei 3-252053). The oxygen content has an influence upon the crystalline structure of a carbon material, and when the content is the above value or over, the physical properties of the non-graphitizable carbon can be improved, thereby the capacity of the anode 22 can be improved. Moreover, the petroleum pitch can be obtained, for example, by distillation (vacuum distillation, atmospheric distillation or steam distillation), thermal polycondensation, extraction, and chemical polycondensation of tars obtained through thermally cracking coal tar, ethylene bottom oil or crude oil at high temperature, asphalt or the like. Further, as a method of forming an oxygen cross-link, for example, a wet method of reacting a solution such as nitric acid, sulfuric acid, hypochlorous acid or a mixture thereof and petroleum pitch, a dry method of reacting an oxidizing gas such as air or oxygen and petroleum pitch, or a method of reacting a solid reagent such as sulfur, ammonium nitrate, ammonium persulfate or ferric chloride and petroleum pitch can be used.

The organic material as the starting material is not limited to them, and any other organic material which can become non-graphitizable carbon through the solid-phase carbonization by an oxygen cross-linking process or the like may be used.

As the non-graphitizable carbon, in addition to the non-graphitizable carbon formed of the above organic material as a starting material, a compound including phosphorus (P), oxygen and carbon as main components which is disclosed in Japanese Unexamined Patent Application Publication No. Hei 3-137010 is preferable, because the above-described parameters of physical properties are exhibited.

As the anode material capable of inserting and extracting lithium, a metal element or a metalloid element capable of forming an alloy with lithium, or an alloy of the metal element or the metalloid element, or a compound of the metal element or the metalloid element is cited. They are preferable because a higher energy density can be obtained, and it is more preferable to use them with a carbon material, because a higher energy density and superior cycle characteristics can be obtained. In the description, the alloy means not only an alloy including two or more kinds of metal elements but also an alloy including one or more kinds of metal elements and one or more kinds of metalloid elements. As the composition of the alloy, a solid solution, a eutectic (eutectic mixture), an intermetallic compound or the coexistence of two or more kinds selected from them is cited.

Examples of such a metal element or a metalloid element include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). As an alloy or a compound thereof, for example, an alloy or a compound represented by a chemical formula $Ma_sMb_tLi_u$ or a chemical formula $Ma_pMc_qMd_r$ is cited. In these chemical formulas, Ma represents at least one kind selected from metal elements and metalloid elements which can form an alloy or a compound with lithium, Mb represents at least one kind selected from metal elements and metalloid elements except for lithium and Ma, Mc represents at least one kind selected from nonmetal elements, and Md represents at least one kind selected from metal elements and metalloid elements except for Ma. Further, the values of s, t, u, p, q and r are $s>0$, $t≧0$, $u≧0$, $p>0$, $q>0$ and $r≧0$, respectively.

Among them, a metal element or a metalloid element selected from Group 4B elements in the short form of the periodic table of the elements, or an alloy thereof or a compound thereof is preferable, and silicon or tin, or an alloy thereof or a compound thereof is more preferable. They may have a crystalline structure or an amorphous structure.

Specific examples of such an alloy or such a compound include LiAl, AlSb, CuMgSb, SiB$_4$, SiB$_6$, Mg$_2$Si, Mg$_2$Sn, Ni$_2$Si, TiSi$_2$, MoSi$_2$, CoSi$_2$, NiSi$_2$, CaSi$_2$, CrSi$_2$, Cu$_5$Si, FeSi$_2$, MnSi$_2$, NbSi$_2$, TaSi$_2$, VSi$_2$, WSi$_2$, ZnSi$_2$, SiC, Si$_3$N$_4$, Si$_2$N$_2$O, SiO$_v$ ($0<v≦2$), SnO$_w$ ($0<w≦2$), SnSiO$_3$, LiSiO, LiSnO and the like.

As the anode material capable of inserting and extracting lithium, other metal compounds or high molecular weight materials are cited. As the metal compounds, oxides such as iron oxide, ruthenium oxide and molybdenum oxide, LiN$_3$, and the like are cited, and as the high molecular weight materials, polyacetylene, polyaniline, polypyrrole and the like are cited.

Among these anode active materials, specifically an anode active material in which an insertion reaction of lithium ions are active is preferably used, and an anode active material with a charge-discharge potential relatively close to that of lithium metal is more preferably used.

Moreover, in the secondary battery, during charge, precipitation of lithium metal on the anode 22 begins at a point where an open circuit voltage (that is, battery voltage) is lower than an overcharge voltage. In other words, in a state where the open circuit voltage is lower than the overcharge voltage, the lithium metal is precipitated on the anode 22, so the capacity of the anode 22 is represented by the sum of a capacity component by insertion and extraction of lithium and a capacity component by precipitation and dissolution of the lithium metal. Therefore, in the secondary battery, both of the anode material capable of inserting and extracting lithium and the lithium metal have a function as an anode active material, and the anode material capable of inserting and extracting lithium is a base material when the lithium metal is precipitated.

The overcharge voltage means an open circuit voltage when the battery is overcharged, and indicates, for example, a voltage higher than the open circuit voltage of a battery "fully charged" described in and defined by "Guideline for safety assessment of lithium secondary batteries" (SBA G1101) which is one of guidelines drawn up by Japan Storage Battery industries Incorporated (Battery Association of Japan). In other words, the overcharge voltage indicates a higher voltage than an open circuit voltage after charge by using a charging method used when a nominal capacity of each battery is determined, a standard charging method or a recommended charging method. More specifically, the secondary battery is fully charged, for example, at an open circuit voltage of 4.2 V, and the lithium metal is precipitated on a surface of the anode material capable of inserting and extracting lithium in a part of the range of the open circuit voltage of from 0 V to 4.2 V.

Thereby, in the secondary battery, a higher energy density can be obtained, and cycle characteristics and high-speed charge characteristics can be improved, because of the following reason. The secondary battery is equivalent to a conventional lithium secondary battery using lithium metal or a lithium alloy for the anode in a sense that the lithium metal is precipitated on the anode 22. However, in the secondary battery, the lithium metal is precipitated on the anode material capable of inserting and extracting lithium, thereby it is considered that the secondary battery has the following advantages.

Firstly, in the conventional lithium secondary battery, it is difficult to uniformly precipitate the lithium metal, which causes degradation in cycle characteristics; however, the anode material capable of inserting and extracting lithium generally has a large surface area, so in the secondary battery, the lithium metal can be uniformly precipitated. Secondly, in the conventional lithium secondary battery, a change in volume according to precipitation and dissolution of the lithium metal is large, which also causes degradation in the cycle characteristics; however, in the secondary battery, the lithium metal is precipitated in gaps between particles of the anode material capable of inserting and extracting lithium, so a change in volume is small. Thirdly, in the conventional lithium secondary battery, the larger the amount of precipitation and dissolution of the lithium metal is, the bigger the above problem becomes; however, in the secondary battery, insertion and extraction of lithium by the anode material capable of inserting and extracting lithium contributes to a charge-discharge capacity, so in spite of a large battery capacity, the amount of precipitation and dissolution of the lithium metal is small. Fourthly, when the conventional lithium secondary battery is quickly charged, the lithium metal is more nonuniformly precipitated, so the cycle characteristics are further degraded. However, in the secondary battery, in an initial charge, lithium is inserted into the anode material capable of inserting and extracting lithium, so the secondary battery can be quickly charged.

In order to more effectively obtain these advantages, for example, it is preferable that at the maximum voltage before the open circuit voltage becomes an overcharge voltage, the maximum capacity of the lithium metal precipitated on the anode 22 is from 0.05 times to 3.0 times larger than the charge capacity of the anode material capable of inserting and extracting lithium. When the amount of precipitation of the lithium metal is too large, the same problem as that which occurs in the conventional lithium secondary battery arises, and when the amount is too small, the charge-discharge capacity cannot be sufficiently increased. Moreover, for example, the discharge capacity of the anode material capable of inserting and extracting lithium is preferably 150 mAh/g or over. The larger the ability to insert and extract lithium is, the smaller the amount of precipitation of the lithium metal relatively becomes. In addition, the charge capacity of the anode material is determined by the quantity of electricity when the battery with the anode made of the anode material as an anode active material and the lithium metal as a counter electrode is charged by a constant-current constant-voltage method until reaching 0 V. For example, the discharge capacity of the anode material is determined by the quantity of electricity when the battery is subsequently discharged for 10 hours or more by a constant-current method until reaching 2.5 V.

Figure 3:
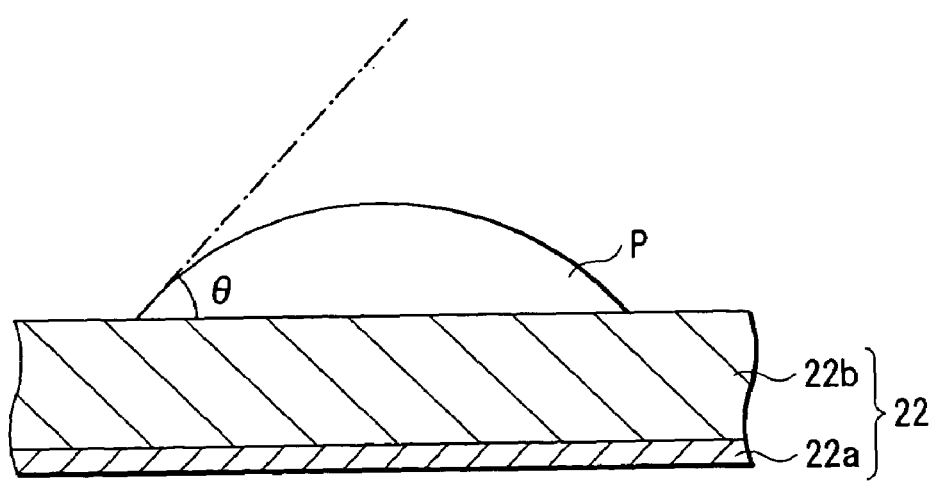
FIG. 3 is an illustration for describing a contact angle that an anode forms with a propylene carbonate drop.

Moreover, in the secondary battery, when 1 μdm$^3$ of propylene carbonate is dropped on the mixture layer 22b of the anode 22 at 23° C., the mixture layer 22b has liquid absorption properties that a contact angle θ that the mixture layer 22b forms with a propylene carbonate drop P (refer to FIG. 3) becomes 10 degrees or less within 100 seconds. In the secondary battery, precipitation-dissolution reactions of lithium proceed only in a portion where the electrolyte solution is held, and a portion where lithium is precipitated depends upon speed with which the mixture layer 22b is impregnated with the electrolyte solution, so the mixture layer 22b with such a structure is impregnated with the electrolyte solution quickly and uniformly, thereby lithium metal can be uniformly precipitated. In other words, it is considered that lithium metal can be prevented from being nonuniformly precipitated, thereby falling off of precipitated lithium or a loss of lithium due to a reaction between the precipitated lithium and the electrolyte solution can be prevented.

As a method of impregnating the mixture layer 22b with the electrolyte solution quickly and uniformly, it can be considered to increase porosity, but when the porosity is increased, the volume density decreases, so it is difficult to obtain a high energy density. Moreover, it is considered that the speed with which the mixture layer 22b is impregnated with the electrolyte solution is not proportional to all air gaps in the electrode, and depends upon the distribution of air gaps. For example, in spite of the fact that each air gap is small, when air gaps are uniformly and continuously distributed on the whole electrode, the mixture layer 22b can be quickly impregnated with the electrolyte solution. On the other hand, in spite of the fact that the volume of each air gap is large, when the air gaps are distributed unevenly and intermittently, it is difficult to quickly impregnate the mixture layer 22b with the electrolyte solution. Therefore, in the embodiment, the liquid absorption properties of the mixture layer 22b is defined as described above, so even if the volume density increases, the mixture layer 22b can be impregnated with the electrolyte solution quickly and uniformly. In order to obtain a sufficient energy density, the volume density of the mixture layer 22b is preferably 1.5 g/cm$^3$ or over, more preferably 1.65 g/cm$^3$, and most preferably 1.75 g/cm$^3$. When a carbon material is used as the anode active material, the theoretical true density of graphite as the carbon material is 2.265 g/cm$^3$, so the volume density of the mixture layer 22b is actually 2.2 g/cm$^3$ or less.

In order for the mixture layer 22b to obtain the above liquid absorption properties, air gaps formed in the anode active material are required to be reduced in size and be uniformly distributed. For the purpose, the powdered anode active material preferably has a spherical shape so that the anode active material can be most closely packed in the mixture layer 22b. More specifically, the average value of circularity (that is, average circularity) of a shadow of the anode active material in the mixture layer 22b is preferably 0.7 or over.

The circularity is defined by a ratio between the area of a shadow and the area of a region where the center of a circle with an area equal to the area of the shadow (the diameter of the circle is called effective diameter) and the shadow are overlapped when the center of the circle is placed in the center of the shadow, and is represented by Mathematical Formula 1.

(Mathematical Formula 1)

Circularity=A/S

In the formula, A represents the area of the region where the circle with an area equal to the area of the shadow and the shadow are overlapped when the center of the circle is placed in the center of the shadow, and S represents the area of the shadow.

Further, the effective diameter is represented by Mathematical Formula 2.

(Mathematical Formula 2)

Effective diameter=$2(S/\Pi)^{1/2}$

In the formula, $\Pi$ represents the circular constant.

Examples of the spherical anode active material include a mesophase microbead formed through separating a mesophase spherule produced in the liquid-phase carbonization process from a pitch matrix, a material formed through carbonazing a spherical polymer of a high molecular weight resin, a material formed through molding tar or pitch in a spherical shape and oxidizing it, and then carbonizing it. Moreover, a material formed through granulating non-spherical carbon particles to form them in a spherical shape in a secondary particle level may be used. To granulate the particles, for example, a wet method in which the particles are agitated and rolled using a liquid including a solvent or a granulating aid to granulate, or a dry method in which the particles are rolled without any additives to granulate can be used. Further, a material formed through pulverizing non-spherical carbon particles to form them in a spherical shape may be used.

In order for the mixture layer 22b to have the above liquid absorption properties, a material which resists crushing and maintains air gaps between particles without eliminating them is preferably included as the powdered anode active material. As such an anode active material, a material with a modulus of volume elasticity of 14 GPa or over is preferable. Further, an anode active material may have a coating with a modulus of volume elasticity of 14 GPa or over in a portion of a surface thereof so that the whole anode active material has an average modulus of volume elasticity of 14 GPa or over.

Examples of the anode active material with a modulus of volume elasticity of 14 GPa or over include amorphous carbon such as diamond-like carbon, non-graphitizable carbon, tin (Sn) and zinc (Zn). As the material of the coating with a modulus of volume elasticity of 14 GPa or over, in order not to reduce the energy density, a material with a capacity by insertion and extraction of lithium is more preferable, but it is not limited to this. In addition to the above material, for example, various kinds of transition metal such as copper and nickel, various transition metal compounds such as aluminum oxide ($Al_2O_3$) and titanium oxide ($TiO_2$) may be used. As a method of coating the surface of the anode active material with the material, any of well-known methods can be used. For example, the material may be added while forming slurry which will be described later, or may be sintered after dry or wet supporting, or vapor deposition, CVD (chemical vapor deposition) or the like may be used.

Moreover, in order for the mixture layer 22b to have the above liquid absorption properties, as the powdered anode active material, a material having a thin hole through a powder so as to impregnate the material with the electrolyte solution is preferably included. The content of the anode active material with a through hole in the mixture layer 22b is preferably 50 wt % or over, because a path where the electrolyte solution penetrates can be sufficiently secured.

Further, as a method of forming a thin through hole, for example, a well-known method such as a granulating method, or a method in which a material capable of being removed such as pitch which is vaporized and desorbed during heat treatment according to carbonization is added, and then removed can be used. For example, in the case of the granulating method, a wet method in which the particles are agitated and rolled using a liquid including a solvent or a granulating aid to granulate, or a dry method in which the particles are rolled without any additives to granulate can be used.

The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated. Among them, a porous film made of polyolefin is preferably used, because by use of the porous film, a short circuit can be effectively prevented, and the safety of the battery can be improved by a shutdown effect. More specifically, polyethylene can obtain a shutdown effect within a range of from 100° C. to 160° C., and is superior in electrochemical stability, so polyethylene is preferably used as the material of the separator 23. Moreover, polypropylene is also preferably used, and any other resin having chemical stability can be used by copolymerizing or blending with polyethylene or polypropylene.

The porous film made of polyolefin is obtained through the following steps, for example. After a molten polyolefin composite is kneaded with a molten low-volatile solvent in liquid form to form a solution uniformly containing a high concentration of the polyolefin composite, the solution is extruded through a die, and is cooled to form a gel-form sheet, then the gel-form sheet is drawn to obtain the porous film.

As the low-volatile solvent, for example, a low-volatile aliphatic group such as nonane, decane, decalin, p-xylene, undecane or liquid paraffin, or a cyclic hydrocarbon can be used. A composition ratio of the polyolefin composite and the low-volatile solvent is preferably 10 wt % to 80 wt % of the polyolefin composite, and more preferably 15 wt % to 70 wt % of the polyolefin composite, when the total ratio of the polyolefin composite and the low-volatile solvent is 100 wt %. When the composition ratio of the polyolefin composite is too small, during formation, swelling or neck-in becomes large at the exit of the die, so it is difficult to form the sheet. On the other hand, when the composition ratio of the polyolefin composite is too large, it is difficult to prepare a uniform solution.

When the solution containing a high concentration of the polyolefin composite is extruded through the die, in the case of a sheet die, a gap preferably has, for example, 0.1 mm to 5 mm. Moreover, it is preferable that an extrusion temperature is within a range of from 140° C. to 250° C., and an extrusion speed is within a range of from 2 cm/minute to 30 cm/minute.

The solution is cooled to at least a gelling temperature or less. As a cooling method, a method of directly making the solution contact with cooling air, cooling water, or any other cooling medium, a method of making the solution contact with a roll cooled by a cooling medium or the like can be used. Moreover, the solution containing a high concentration of the polyolefin composite which is extruded from the die may be pulled before or during cooling at a pulling ratio of from 1 to 10, preferably from 1 to 5. It is not preferable to pull the solution at a too large pulling ratio, because neck-in becomes large, and a rupture tends to occur during drawing.

It is preferable that, for example, the gel-form sheet is heated, and then is biaxially drawn through a tenter process, a roll process, a rolling process, or a combination thereof. At this time, either simultaneous drawing in all direction or sequential drawing may be used, but simultaneous secondary drawing is preferable. The drawing temperature is preferably equivalent to or lower than a temperature of 10° C. higher than the melting point of the polyolefin composite, and more preferably a crystal dispersion temperature or over and less than the melting point. A too high drawing temperature is not preferable, because effective molecular chain orientation by drawing cannot be achieved due to melting of the resin, and when the drawing temperature is too low, softening of the resin is insufficient, thereby a rupture of the gel-form sheet tends to occur during drawing, so the gel-form sheet cannot be drawn at a high enlargement ratio.

After drawing the gel-form sheet, the drawn film is preferably cleaned with a volatile solvent to remove the remaining low-volatile solvent. After cleaning, the drawn film is dried by heating or air blasting to volatilize the cleaning solvent. As the cleaning solvent, for example, an easily volatile material, that is, a hydrocarbon such as pentane, hexane or heptane, a chlorinated hydrocarbon such as methylene chloride or carbon tetrachloride, a fluorocarbon such as trifluoroethane, ether such as diethyl ether or dioxane is used. The cleaning solvent is selected depending upon the used low-volatile solvent, and one kind selected from the cleaning solvents or a mixture thereof is used. A method of immersing in the volatile solvent to extract, a method of sprinkling the volatile solvent, or a combination thereof can be used for cleaning. Cleaning is performed until the remaining low-volatile solvent in the drawn film becomes less than 1 part by mass relative to 100 parts by mass of the polyolefin composite.

The electrolyte solution with which the separator 23 is impregnated includes a liquid solvent, for example, a nonaqueous solvent such as an organic solvent or the like, and a lithium salt which is an electrolyte salt dissolved in the nonaqueous solvent. The liquid nonaqueous solvent is made of, for example, a nonaqueous compound, and has an intrinsic viscosity of 10.0 mPa·s or less at 25° C. The nonaqueous solvent with an intrinsic viscosity of 10.0 mPa·s or less in a state that the electrolyte salt is dissolved therein may be used, and in the case where a plurality of kinds of nonaqueous compounds are mixed to form a solvent, the solvent may have an intrinsic viscosity of 10.0 mPa·s or less in a state that the compounds are mixed. As such a nonaqueous solvent, it is preferable that a high dielectric solvent with relatively high dielectric constant is mainly used, and further a mixture including a plurality of solvents with low viscosity is used.

Examples of the high dielectric solvent include ethylene carbonate, propylene carbonate, butylene carbonate, vinylene carbonate, sulfolane, γ-butyrolactone and kinds of valerolactone, and one kind or a mixture including two or more kinds selected from them may be used.

Examples of the solvent with low viscosity include symmetric chain carbonates such as diethyl carbonate and dimethyl carbonate, asymmetric chain carbonate such as methyl ethyl carbonate and methyl propyl carbonate, carboxylate such as methyl propionate and ethyl propionate, phosphate such as trimethyl phosphate and triethyl phosphate, and one kind or a mixture including two kinds selected from them may be used.

Moreover, in addition to the above solvents, vinylene carbonate, trifluoropropylene carbonate, 1,2-dimethoxyethane, 1,2-diethoxymethane, tetrahydrofuran, 2-methyltetrahydrofuran, 4-methyl-1,3-dioxolane, sulfolane, methylsulfolane, 2,4-difluoroanisole, 2,6-difluoroanisole or the like is preferably used, because battery characteristics can be improved. The content thereof in the nonaqueous solvent is preferably 40 vol % or less, more preferably 20 vol % or less.

Examples of the lithium salt include $LiPF_6$, $LiClO_4$, $LiAsF_6$, $LiBF_4$, $LiB(C_6H_5)_4$, $CH_3SO_3Li$, $CF_3SO_3Li$, $LiN(CF_3SO_2)_2$, $LiC(CF_3SO_2)_3$, $LiCl$ and $LiBr$, and one kind or a mixture including two or more kinds selected from them may be used. When a mixture including two or more kinds is used, $LiPF_6$ is preferably used as a main component, because $LiPF_6$ has high conductivity and superior oxidation stability.

The content (concentration) of the lithium salt in a solvent is preferably within a range of 0.5 mol/kg to 3.0 mol/kg. When the content is out of the range, there may be cases where sufficient battery characteristics cannot be obtained due to an extreme decline in ionic conductivity.

Instead of the electrolyte solution, an electrolyte in which a retaining body made of a high molecular weight compound or an inorganic compound retains an electrolyte solution may be used. The components of the electrolyte solution (that is, a solvent and an electrolyte salt) are as described above. Examples of the high molecular weight compound include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene and polycarbonate. Specifically, in terms of electrochemical stability, a high molecular weight compound having the structure of polyacrylonitrile, polyvinylidene fluoride, polyhexafluoropropylene or polyethylene oxide is preferably used. An amount of the high molecular weight compound added to the electrolyte solution varies depending upon compatibility between them, however, in general, an amount of the high molecular weight compound equivalent to 5 wt % to 50 wt % of the electrolyte solution is preferably added.

The secondary battery can be manufactured through the following steps, for example.

At first, for example, the cathode active material, an electronic conductor, and a binder are mixed to prepare a cathode mixture, and the cathode mixture is dispersed in a solvent such as N-methyl-2-pyrrolidone to produce cathode mixture slurry in paste form. After the cathode mixture slurry is applied to the current collector 21a, and the solvent is dried, the mixture layer 21b is formed through compression molding by a roller press or the like so as to form the cathode 21.

Next, for example, an anode material capable of inserting and extracting lithium and a binder are mixed to prepare an anode mixture, then the anode mixture is dispersed in a solvent such as N-methyl-2-pyrrolidone to produce anode mixture slurry in paste form. After the anode mixture slurry is applied to the current collector 22*a*, and the solvent is dried, the mixture layer 22*b* is formed through compression molding by a roller press or the like so as to form the anode 22. At this time, the circularity, the modulus of volume elasticity, the presence or absence of the through hole and the like in the anode material capable of inserting and extracting lithium are adjusted to control the liquid absorption properties of the mixture layer 22*b*.

Then, the cathode lead 25 is attached to the current collector 21*a* by welding or the like, and the anode lead 26 is attached to the current collector 22*a* by welding or the like. After that, for example, a laminate including the cathode 21 and the anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 sandwiched between a pair of insulating plates 12 and 13 is contained in the battery can 11. After the spirally wound laminate including the cathode 21 and the anode 22 is contained in the battery can 11, the electrolyte is injected into the battery can 11, and the separator 23 is impregnated with the electrolyte. After that, the battery cover 14, the safety valve mechanism 15 and the PTC device 16 are fixed in an opened end portion of the battery can 11 through caulking by the gasket 17. Thereby, the secondary battery shown in FIG. 1 is formed.

The secondary battery works as follows.

In the secondary battery, when charge is carried out, lithium ions are extracted from the mixture layer 21*b*, and are inserted into the anode material capable of inserting and extracting lithium included in the mixture layer 22*b* through the electrolyte with which the separator 23 is impregnated. When the charge further continues, in a state where the open circuit voltage is lower than the overcharge voltage, the charge capacity exceeds the charge capacity of the anode material capable of inserting and extracting lithium, and then lithium metal begins to be precipitated on the surface of the anode material capable of inserting and extracting lithium. After that, until the charge is completed, precipitation of lithium metal on the anode 22 continues.

Next, when discharge is carried out, at first, the lithium metal precipitated on the anode 22 is eluted as ions, and is inserted into the mixture layer 21*b* through the electrolyte with which the separator 23 is impregnated. When the discharge further continues, lithium ions inserted into the anode material capable of inserting and extracting lithium in the mixture layer 22*b* are extracted, and are inserted into the mixture layer 21*b* through the electrolyte. Therefore, in the secondary battery, the characteristics of the conventional lithium secondary battery and the lithium-ion secondary battery, that is, a higher energy density and superior charge-discharge cycle characteristics can be obtained.

Specifically in the embodiment, the mixture layer 22*b* of the anode 22 has the liquid absorption properties that when 1 µdm$^3$ of propylene carbonate is dropped at 23° C., the contact angle θ that the mixture layer 22*b* forms with the propylene carbonate drop P becomes 10 degrees or less within 100 seconds, so the mixture layer 22*b* is impregnated with the electrolyte solution quickly and uniformly. Therefore, lithium metal is uniformly precipitated on the whole mixture layer 22*b*. Thereby, falling off of precipitated lithium due to nonuniform precipitation of the lithium metal or a loss of lithium due to a reaction between the precipitated lithium and the electrolyte solution can be prevented.

Thus, in the embodiment, the mixture layer 22*b* has the liquid absorption properties that when 1 µdm$^3$ of propylene carbonate is dropped at 23° C., the contact angle θ that the mixture layer 22*b* forms with the propylene carbonate drop P becomes 10 degrees or less within 100 seconds, so the mixture layer 22*b* is impregnated with the electrolyte solution quickly and uniformly. Thereby, lithium metal can be uniformly precipitated on the whole mixture layer 22*b*. Therefore, while maintaining a high energy density, superior charge-discharge cycle characteristics can be obtained.

Accordingly, the battery can contribute to reduction in size and weight of portable electric devices typified by cellular phones, PDAs or laptop computers.

Moreover, in the embodiment, the average circularity of the shadow of the anode active material is 0.7 or over, the anode active material with a modulus of volume elasticity of 14 GPa or over or the anode active material having a coating with a modulus of volume elasticity of 14 GPa in at least a portion of the surface is used, or the content of the anode active material with a through hole in the mixture layer 22*b* is 50 wt % or over, so the anode 22 according to the embodiment can be easily obtained.

Further, in the embodiment, the secondary battery in which the capacity of the anode 22 is represented by the sum of a capacity component by insertion and extraction of lithium and a capacity component by precipitation and dissolution of lithium is described as an example, but the anode 22 according to the embodiment can be applied to a secondary battery with any other structure.

As the secondary battery with the other structure, for example, a so-called lithium-ion secondary battery in which the capacity of the anode is represented by a capacity component by insertion and extraction of lithium is cited. For example, the lithium-ion secondary battery has the same structure as the above-described secondary battery, except that the amount of an anode material capable of inserting and extracting lithium is relatively large, compared to the cathode active material, so during charge, lithium metal is not participated on the anode.

In the lithium-ion secondary battery, it is required to insert lithium ions into the anode, then to disperse the ions in a solid until the lithium-ion secondary battery is fully charged, so the speed of impregnating the anode 22 with the electrolyte solution is not limited to a reacting portion of the anode, unless the speed is impractically slow. However, when the mixture layer can be impregnated with the electrolyte solution quickly and uniformly, an electrode reaction can be sufficiently carried out. Therefore, also in the lithium-ion secondary battery, when the mixture layer of the electrode has the liquid absorption properties that when 1 µdm$^3$ of propylene carbonate is dropped on the mixture layer at 23° C., the contact angle that the mixture layer forms with the propylene carbonate drop becomes 10 degrees or less within 100 seconds, while maintaining a high energy density, battery characteristics such as charge-discharge cycle characteristics can be improved.

Next, specific examples of the invention will be described in detail below.

EXAMPLE 1-1 THROUGH 1-18

At first, 90 wt % of a powdered anode material capable of inserting and extracting lithium as the anode active material and 10 wt % of polyvinylidene fluoride as the binder were mixed to form an anode mixture. At that time, as the anode material capable of inserting and extracting lithium, in Examples 1-1 through 1-6, artificial graphite with an electrochemical equivalent of 512 mAh/cm$^3$ in a insertion reaction of lithium, and a modulus of volume elasticity of 11.0 GPa was used, and the average circularity of the shadow was 0.75 in Examples 1-1 through 1-4 and 0.65 in Examples 1-5 and 1-6. The artificial graphite was obtained as follows. A molded body was formed through kneading and hardening a filler which was a material of graphitizing coke particles with a pitch binder, and then the molded body was graphitized at 3000° C. to obtain the artificial graphite. Moreover, in Examples 1-7 through 1-10, natural graphite with a modulus of volume elasticity of 14.5 GPa as the whole powder and an average circularity of the shadow of 0.60 was used. The natural graphite was obtained through coating the surface of natural graphite with a modulus of volume elasticity of 13.5 GPa and an electrochemical equivalent of 576 mAh/cm$^3$ in an insertion reaction of lithium with a furfuryl alcohol resin, and then sintering the natural graphite at 1000° C. Further, in Examples 1-11 and 1-12, natural graphite with a modulus of volume elasticity of 13.5 GPa, an average circularity of the shadow of 0.60, and an electrochemical equivalent of 576 mAh/cm$^3$ in an insertion reaction of lithium was used. In addition, Examples 1-13 through 1-18, a mixture including artificial graphite with a through hole, an average circularity of the shadow of 0.60 and a modulus of volume elasticity of 11.0 GPa and artificial graphite with no through hole, an average circularity of the shadow of 0.60 and a modulus of volume elasticity of 11.0 GPa was used. The artificial graphite with a through hole was formed through increasing the amount of the pitch binder more than that in Examples 1-1 through 1-6 to have a larger thin hole, thereby making the thin hole through a particle. The content of the powdered anode active material with a through hole in the mixture layer 22b was 55 wt % in Examples 1-13 through 1-16 and 45 wt % in Examples 1-17 and 1-18. The presence or the absence of the thin hole was checked through observing a sectional surface of the particle with an electron microscope.

Next, the anode mixture was dispersed in N-methyl-2-pyrrolidone as a solvent to form cathode mixture slurry in paste form. After the cathode mixture slurry was uniformly applied to both sides of the current collector 22a made of strip-shaped copper foil with a thickness of 15 μm, and was dried. Then, the mixture layer 22b was formed through compression molding with a certain pressure so as to form the anode 22 with the total thickness of 160 μm. At that time, the pressure was changed in Examples 1-1 through 1-18 to change the volume density of the mixture layer 22b as shown in Tables 1 through 3.

In the anode 22 of each of Examples 1-1 through 1-18, the liquid absorption properties of the mixture layer 22b were checked. More specifically, 1 μdm$^3$ of propylene carbonate was taken with a syringe, and was dropped on the mixture layer 22b of the anode 22. Then, the time until the contact angle θ that the mixture layer 22 formed with the propylene carbonate became 10 degrees or less at 23° C. (that is, liquid absorption time) was measured with a stopwatch. The results are shown in Tables 1 through 3 and FIGS. 4 through 6.

As Comparative Examples 1-1 and 1-2 relative to Examples 1-1 through 1-6, anodes were formed as in the case of Examples 1-1 through 1-6, except that the average circularity of the shadow of the anode material capable of inserting and extracting lithium or the volume density of the mixture layer was changed. As Comparative Examples 1-3 and 1-4 relative to Examples 1-7 through 1-12, anodes were formed as in the case of Examples 1-7 through 1-12, except that natural graphite in which the modulus of volume elasticity of the anode material capable of inserting and extracting lithium was 13.5 GPa and an electrochemical equivalent in an insertion reaction of lithium was 576 mAh/cm$^3$ was used, and the volume density of the mixture layer was changed. Further, as Comparative Examples 1-5 and 1-6 relative to Examples 1-13 through 1-18, anodes were formed as in the case of Examples 1-13 through 1-18, except that the content of the powdered anode active material with a through hole, or the volume density of the mixture layer 22b was changed. In the anodes of Comparative Examples 1-1 through 1-6, as in the case of Examples 1-1 through 1-18, the liquid absorption properties were checked. The obtained results are shown in Tables 1 through 3 and FIGS. 4 and 6.

Figure 4:
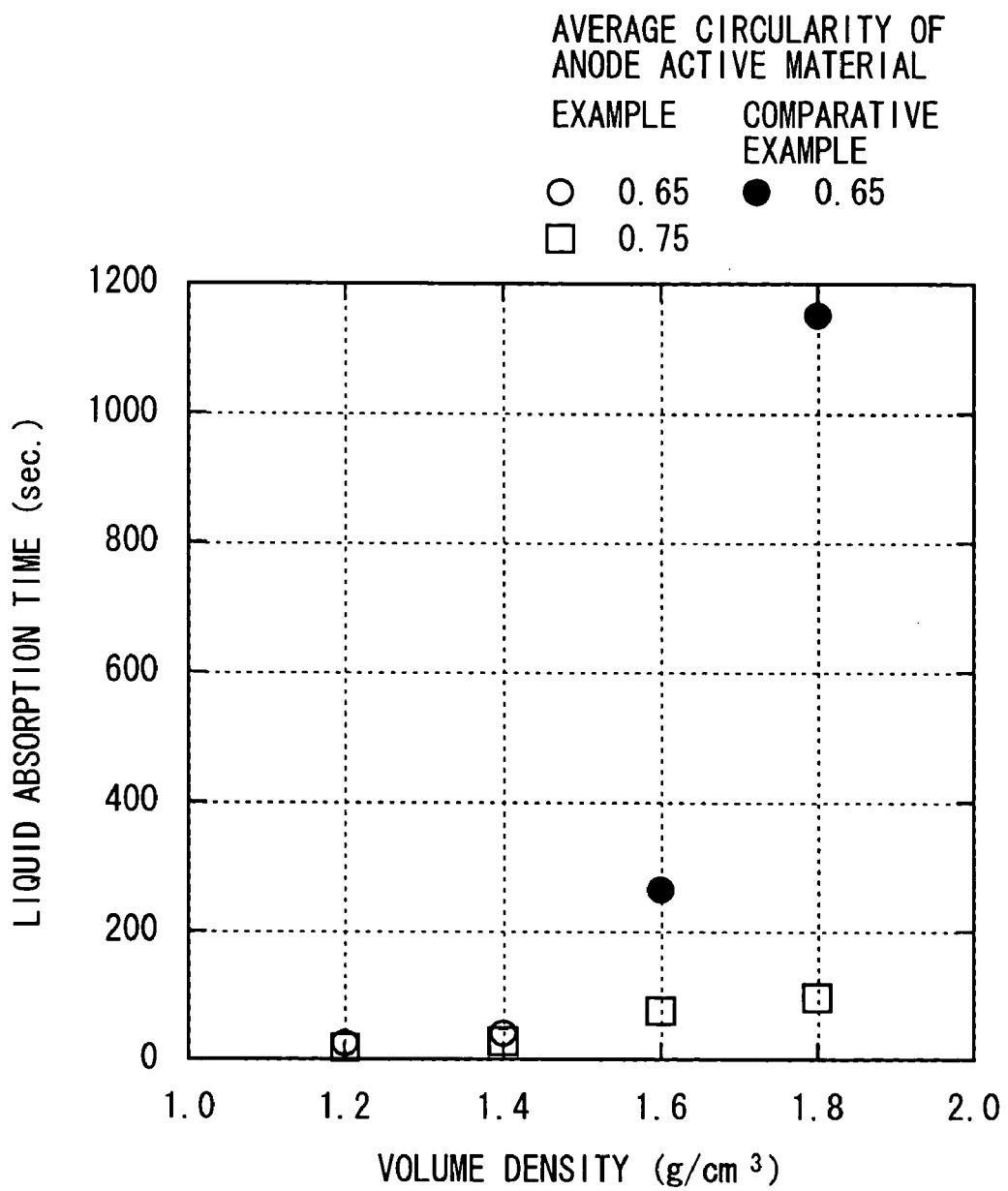
FIG. 4 is a plot showing a relationship between volume density and liquid absorption time in a mixture layer of an anode according to Examples 1-1 through 1-6 of the invention.
Figure 5:
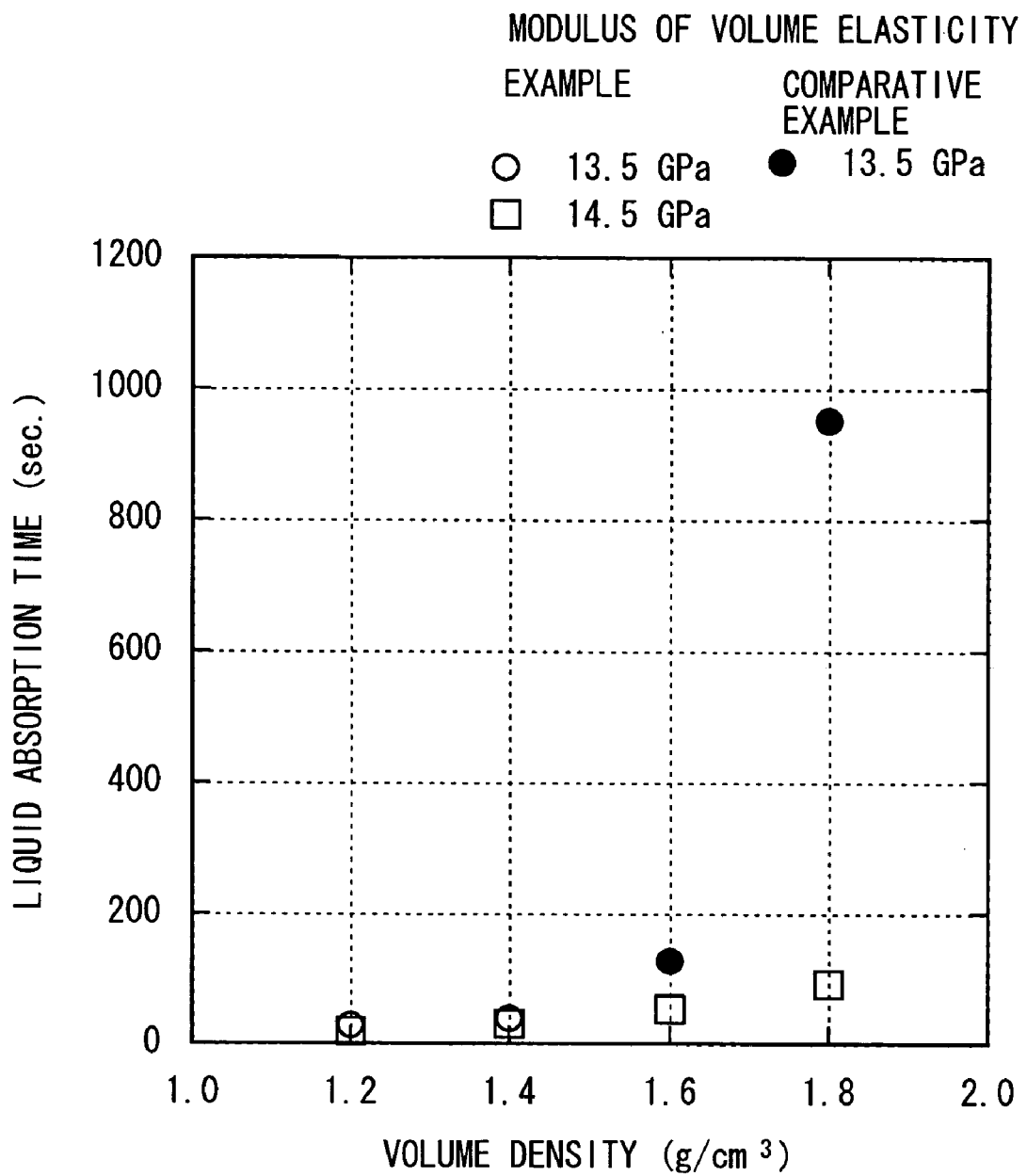
FIG. 5 is a plot showing a relationship between volume density and liquid absorption time in a mixture layer of an anode according to Examples 1-7 through 1-12 of the invention.
Figure 6:
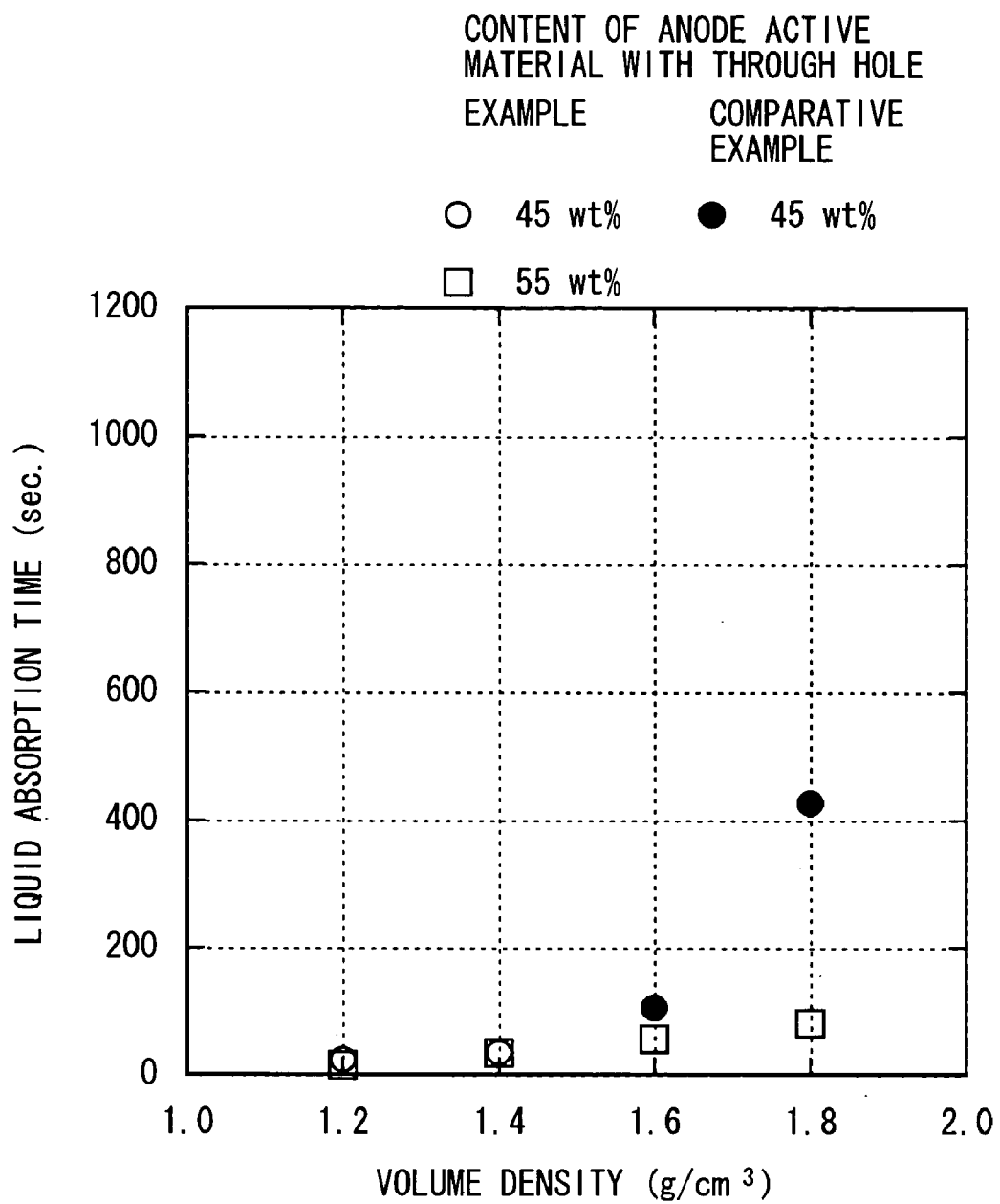
FIG. 6 is a plot showing a relationship between volume density and liquid absorption time in a mixture layer of an anode according to Examples 1-13 through 1-18 of the invention.

It was obvious from Tables 1 through 3 and FIGS. 4 through 6 that when the volume density was 1.6 g/cm$^3$ or over, the liquid absorption properties sharply declined, but when the average circularity of the shadow of the powdered anode active material was 0.7 or over, when the modulus of volume elasticity of the powdered anode active material was 14 GPa or over, or when the content of the powdered anode active material with a through hole in the mixture layer 22b was 50 wt % or over, the decline could be prevented, and even if the volume density was 1.8 g/cm$^3$ or over, the time until the contact angle θ that the anode 22 formed with 1 μdm$^3$ of propylene carbonate became 10 degrees or less at 23° C. could be within 100 seconds.

Moreover, a lithium-ion secondary battery in which the capacity of the anode 22 was represented by a capacity component by insertion and extraction of lithium was formed using the anode 22 of each of Examples 1-1 through 1-18 and Comparative Examples 1-1 through 1-6. The shape of the battery was cylindrical as shown in FIGS. 1 and 2.

At that time, the cathode 21 was formed through the following steps. At first, lithium carbonate (Li$_2$CO$_3$) and cobalt carbonate (CoCO$_3$) were mixed at a ratio (molar ratio) of Li$_2$CO$_3$:CoCO$_3$=0.5:1, and the mixture was fired in air at 900° C. for 5 hours to obtain lithium-cobalt complex oxide as the cathode material. When the X-ray diffraction of the obtained lithium•cobalt complex oxide was measured, the diffraction pattern closely matched a peak of LiCoO$_2$ listed in the JCPDS file. Next, the lithium•cobalt complex oxide was pulverized into the form of a powder with a particle diameter of 15 μm at 50% cumulative size which was obtained by a laser diffraction method to form a cathode active material.

Next, 95 wt % of lithium.cobalt complex oxide powder and 5 wt % of lithium carbonate powder were mixed to prepare a mixture, and then the 94 wt % of the mixture, 3 wt % of ketjen black as an electronic conductor and 3 wt % of polyvinylidene fluoride as a binder were mixed to prepare a cathode mixture. After the cathode mixture was prepared, the cathode mixture was dispersed in N-methyl-2-pyrrolidone as a solvent to produce cathode mixture slurry in paste form. After the cathode mixture slurry was uniformly applied to both sides of the current collector 21a made of strip-shaped aluminum foil with a thickness of 20 μm, and was dried, the mixture layer 21b was formed through compression molding by a roller press so as to form the cathode 21 with the total thickness of 150 μm.

The used electrolyte solution was formed through dissolving a LiPF$_6$ content of 1.5 mol/dm$^3$ in a solvent in which ethylene carbonate and dimethyl carbonate was mixed with equivalent volume. As the separator 23, a stretched microporous polyethylene film with a thickness of 27 μm was used. The outside diameter of the spirally wound electrode body 20 was approximately a little more than 13 mm, and the size of the battery was 14 mm in diameter and 65 mm in height.

A charge-discharge test was carried out on the battery to determine a rated discharge capacity, a rated energy density and a discharge capacity retention ratio. At that time, charge was carried out at a constant current of 400 mA until a battery voltage reached 4.2 V, then the charge was continued at a constant voltage of 4.2 V until a charge time reached 4 hours. Discharge was carried out at a constant current of 400 mA until the battery voltage reached 2.75 V. The discharge capacity in the second cycle was considered as the rated discharge capacity, and the energy density was calculated by the value. The discharge capacity retention ratio was determined as a ratio of the discharge capacity in the 300th cycle to the discharge capacity in the second cycle, that is, (discharge capacity in the 300 cycle)/(discharge capacity in the second cycle)×100. In Tables 4 through 6, results of Examples 1-3, 1-4, 1-9, 1-10, 1-15 and 1-16 are shown together with the results of Comparative Examples 1-1 through 1-6.

It was obvious from Tables 4 through 6 that in Examples 0.1-3, 1-4, 1-9, 1-10, 1-15 and 1-16 in which the liquid absorption time was 100 seconds or less, the discharge capacity retention ratio could be as high as 78% or over, and even if the volume density was increased, the discharge capacity retention ratio hardly declined. On the other hand, in Comparative Examples 1-1 through 1-6 in which the liquid absorption time was longer than 100 seconds, the discharge capacity retention ratio was as low as 74% or less, and in Comparative Examples 1-3, 1-4, 1-5 and 1-6, when the volume density was increased, the discharge capacity retention ratio extremely declined. In other words, it was found out that when the mixture layer 22b had the liquid absorption properties that when 1 dm$^3$ of propylene carbonate was dropped on the mixture layer 22b at 23° C., the contact angle that the mixture layer 22b formed with the propylene carbonate drop P became 10 degrees or less within 100 seconds, while maintaining a high battery capacity and a high energy density, the charge-discharge cycle characteristics could be improved.

EXAMPLES 2-1 THROUGH 2-6

A Battery in which the capacity of the anode 22 was represented by the sum of a capacity component by insertion and extraction of lithium and a capacity component by precipitation and dissolution of lithium was formed using the same anode 22 as that of each of Examples 1-3, 1-4, 1-9, 1-10, 1-15 and 1-16 and Comparative Examples 1-1 through 1-6. The battery was the same as that of Example 1-3, except that the total thickness of the anode 22 was 120 µm.

A charge-discharge test was carried out on the secondary batteries of Examples 2-1 through 2-6 and Comparative Examples 2-1 through 2-6 as in the case of Example 1-3 to determine the rated discharge capacity, the rated energy density and the discharge capacity retention ratio. The obtained results are shown in Tables 7 through 9.

It was obvious from Tables 7 through 9 that in Examples 2-1 through 2-6 in which the liquid absorption time was 100 seconds or less, the discharge capacity retention ratio could be as high as 71% or over, and even if the volume density was increased, the discharge capacity retention ratio hardly declined. On the other hand, in Comparative Examples 2-1 through 2-6 in which the liquid absorption time was longer than 100 seconds, the discharge capacity retention ratio was as low as 68% or less, and when the volume density was increased, the discharge capacity retention ratio extremely declined. In other words, it was found out that in the secondary battery in which the capacity of the anode 22 was represented by the sum of the capacity component by insertion and extraction of lithium and the capacity component by precipitation and dissolution of lithium, when the mixture layer 22b had the liquid absorption properties that when 1 µdm$^3$ of propylene carbonate was dropped on the mixture layer 22b at 23° C., the contact angle θ that the mixture layer 22b formed with the propylene carbonate drop P became 10 degrees or less within 100 seconds, while maintaining a high battery capacity and a high energy density, the charge-discharge cycle characteristics could be improved.

The present invention is described referring to the embodiment and the examples, but the invention is not limited to the above embodiment and the examples, and is variously modified. For example, in the above embodiments and the above examples, the anode 22 has the liquid absorption properties that when 1 µdm$^3$ of propylene carbonate is dropped on the mixture layer 22b of the anode 22 at 23° C., the contact angle θ that the mixture layer 22b forms with the propylene carbonate drop P becomes 10 degrees or less within 100 seconds, but the cathode 21 or both of the cathode 21 and the anode 22 may have the above liquid absorption properties.

Moreover, in the embodiment and the examples, the case where lithium is used as light metal is described; however, the invention can be applied to the case where any other alkali metal such as sodium (Na) and potassium (K), alkaline-earth metal such as magnesium and calcium (Ca), any other light metal such as aluminum, an alloy of lithium, or an alloy thereof is used, thereby the same effects can be obtained. In this case, the anode material capable of inserting and extracting light metal, the cathode active material, the nonaqueous solvent, the electrolyte salt or the like is selected depending upon the light metal. However, lithium or an alloy including lithium is preferably used as the light metal, because voltage compatibility with lithium-ion secondary batteries which are practically used at present is high. Further, when the alloy including lithium is used as the light metal, a material capable of forming an alloy with lithium may be present in the electrolyte or the anode so as to form an alloy during precipitation.

Further, in the embodiments and the examples, the cylindrical type secondary battery with a spirally wound structure is described; however, the invention is applicable to an elliptic type or a polygonal type secondary battery with a spirally wound structure, or a secondary battery with a structure in which the cathode and the anode are folded or laminated in a like manner. In addition, the invention is applicable to a secondary battery with a coin shape, a button shape, a prismatic shape or the like. Further, the invention is applicable to not only the secondary batteries but also primary batteries.

As described above, in the electrode or the battery according to the invention, the mixture layer has the liquid absorption properties that when 1 µdm$^3$ of propylene carbonate is dropped on the mixture layer at 23° C., the contact angle that the mixture layer forms with the propylene carbonated drop is 10 degrees or less within 100 seconds, so the mixture layer can be impregnated with the electrolyte solution quickly and uniformly. Therefore, while maintaining a high energy density, superior charge-discharge cycle characteristics can be obtained.

TABLE 1

| | AVERAGE CIRCULARITY | MODULUS OF VOLUME ELASTICITY (GPa) | CONTENT OF ANODE ACTIVE MATERIAL WITH THROUGH HOLE (wt %) | VOLUME DENSITY (g/cm$^3$) | LIQUID ABSORPTION TIME (sec.) |
|---|---|---|---|---|---|
| EXAMPLE 1-1 | 0.75 | 11.0 | 0 | 1.2 | 18 |
| EXAMPLE 1-2 | 0.75 | 11.0 | 0 | 1.4 | 28 |
| EXAMPLE 1-3 | 0.75 | 11.0 | 0 | 1.6 | 76 |
| EXAMPLE 1-4 | 0.75 | 11.0 | 0 | 1.8 | 97 |
| EXAMPLE 1-5 | 0.65 | 11.0 | 0 | 1.2 | 25 |
| EXAMPLE 1-6 | 0.65 | 11.0 | 0 | 1.4 | 41 |
| COMPARATIVE EXAMPLE 1-1 | 0.65 | 11.0 | 0 | 1.6 | 264 |
| COMPARATIVE EXAMPLE 1-2 | 0.65 | 11.0 | 0 | 1.8 | 1151 |

TABLE 2

| | AVERAGE CIRCULARITY | MODULUS OF VOLUME ELASTICITY (GPa) | CONTENT OF ANODE ACTIVE MATERIAL WITH THROUGH HOLE (wt %) | VOLUME DENSITY (g/cm$^3$) | LIQUID ABSORPTION TIME (sec.) |
|---|---|---|---|---|---|
| EXAMPLE 1-7 | 0.60 | 14.5 | 0 | 1.2 | 19 |
| EXAMPLE 1-8 | 0.60 | 14.5 | 0 | 1.4 | 31 |
| EXAMPLE 1-9 | 0.60 | 14.5 | 0 | 1.6 | 53 |
| EXAMPLE 1-10 | 0.60 | 14.5 | 0 | 1.8 | 91 |
| EXAMPLE 1-11 | 0.60 | 13.5 | 0 | 1.2 | 28 |
| EXAMPLE 1-12 | 0.60 | 13.5 | 0 | 1.4 | 39 |
| COMPARATIVE EXAMPLE 1-3 | 0.60 | 13.5 | 0 | 1.6 | 127 |
| COMPARATIVE EXAMPLE 1-4 | 0.60 | 13.5 | 0 | 1.8 | 951 |

TABLE 3

| | AVERAGE CIRCULARITY | MODULUS OF VOLUME ELASTICITY (GPa) | CONTENT OF ANODE ACTIVE MATERIAL WITH THROUGH HOLE (wt %) | VOLUME DENSITY (g/cm$^3$) | LIQUID ABSORPTION TIME (sec.) |
|---|---|---|---|---|---|
| EXAMPLE 1-13 | 0.60 | 11.0 | 55 | 1.2 | 15 |
| EXAMPLE 1-14 | 0.60 | 11.0 | 55 | 1.4 | 34 |
| EXAMPLE 1-15 | 0.60 | 11.0 | 55 | 1.6 | 56 |
| EXAMPLE 1-16 | 0.60 | 11.0 | 55 | 1.8 | 81 |
| EXAMPLE 1-17 | 0.60 | 11.0 | 45 | 1.2 | 24 |
| EXAMPLE 1-18 | 0.60 | 11.0 | 45 | 1.4 | 35 |
| COMPARATIVE EXAMPLE 1-5 | 0.60 | 11.0 | 45 | 1.6 | 105 |
| COMPARATIVE EXAMPLE 1-6 | 0.60 | 11.0 | 45 | 1.8 | 427 |

TABLE 4

| | STRUCTURE OF ANODE | | | | DISCHARGE | | |
|---|---|---|---|---|---|---|---|
| | AVERAGE CIRCULARITY | VOLUME DENSITY (g/cm³) | LIQUID ABSORPTION TIME (sec.) | TOTAL THICKNESS (μm) | RATED DISCHARGE CAPACITY (mAh) | RATED ENERGY DENSITY (Wh/l) | CAPACITY RETENTION RATIO (%) |
| EXAMPLE 1-3 | 0.75 | 1.6 | 76 | 160 | 857.2 | 325.7 | 81 |
| EXAMPLE 1-4 | 0.75 | 1.8 | 97 | 160 | 857.2 | 338.6 | 80 |
| COMPARATIVE EXAMPLE 1-1 | 0.65 | 1.6 | 264 | 160 | 856.6 | 325.5 | 52 |
| COMPARATIVE EXAMPLE 1-2 | 0.65 | 1.8 | 1151 | 160 | 856.6 | 338.4 | 54 |

TABLE 5

| | STRUCTURE OF ANODE | | | | DISCHARGE | | |
|---|---|---|---|---|---|---|---|
| | MODULUS OF VOLUME ELASTICITY (GPa) | VOLUME DENSITY (g/cm³) | LIQUID ABSORPTION TIME (sec.) | TOTAL THICKNESS (μm) | RATED DISCHARGE CAPACITY (mAh) | RATED ENERGY DENSITY (Wh/l) | CAPACITY RETENTION RATIO (%) |
| EXAMPLE 1-9 | 14.5 | 1.6 | 53 | 160 | 892.5 | 339.1 | 79 |
| EXAMPLE 1-10 | 14.5 | 1.8 | 91 | 160 | 927.8 | 352.5 | 78 |
| COMPARATIVE EXAMPLE 1-3 | 13.5 | 1.6 | 127 | 160 | 891.2 | 338.6 | 54 |
| COMPARATIVE EXAMPLE 1-4 | 13.5 | 1.8 | 951 | 160 | 926.5 | 352.0 | 35 |

TABLE 6

| | STRUCTURE OF ANODE | | | | DISCHARGE | | |
|---|---|---|---|---|---|---|---|
| | CONTENT OF ANODE ACTIVE MATERIAL WITH THROUGH HOLE (wt %) | VOLUME DENSITY (g/cm³) | LIQUID ABSORPTION TIME (sec.) | TOTAL THICKNESS (μm) | RATED DISCHARGE CAPACITY (mAh) | RATED ENERGY DENSITY (Wh/l) | DISCHARGE CAPACITY RETENTION RATIO (%) |
| EXAMPLE 1-15 | 55.0 | 1.6 | 56 | 160 | 863.9 | 328.3 | 84 |
| EXAMPLE 1-16 | 55.0 | 1.8 | 81 | 160 | 898.1 | 341.3 | 83 |
| COMPARATIVE EXAMPLE 1-5 | 45.0 | 1.6 | 105 | 160 | 861.3 | 327.3 | 74 |
| COMPARATIVE EXAMPLE 1-6 | 45.0 | 1.8 | 427 | 160 | 895.4 | 340.3 | 66 |

TABLE 7

| | STRUCTURE OF ANODE | | | | DISCHARGE | | |
|---|---|---|---|---|---|---|---|
| | AVERAGE CIRCULARITY | VOLUME DENSITY (g/m³) | LIQUID ABSORPTION TIME (sec.) | TOTAL THICKNESS (μm) | RATED DISCHARGE CAPACITY (mAh) | RATED ENERGY DENSITY (Wh/l) | CAPACITY RETENTION RATIO (%) |
| EXAMPLE 2-1 | 0.75 | 1.6 | 76 | 120 | 946.1 | 356.6 | 73 |
| EXAMPLE 2-2 | 0.75 | 1.8 | 97 | 120 | 973.4 | 366.9 | 71 |
| COMPARATIVE EXAMPLE 2-1 | 0.65 | 1.6 | 264 | 120 | 945.7 | 356.4 | 52 |
| COMPARATIVE EXAMPLE 2-2 | 0.65 | 1.8 | 1151 | 120 | 973.0 | 366.7 | 34 |

TABLE 8

| | STRUCTURE OF ANODE | | | | DISCHARGE | | |
| --- | --- | --- | --- | --- | --- | --- | --- |
| | MODULUS OF VOLUME ELASTICITY (GPa) | VOLUME DENSITY (g/cm³) | LIQUID ABSORPTION TIME (sec.) | TOTAL THICKNESS (μm) | RATED DISCHARGE CAPACITY (mAh) | RATED ENERGY DENSITY (Wh/l) | CAPACITY RETENTION RATIO (%) |
| EXAMPLE 2-3 | 14.5 | 1.6 | 53 | 120 | 953.1 | 359.4 | 73 |
| EXAMPLE 2-4 | 14.5 | 1.8 | 91 | 120 | 980.6 | 369.9 | 71 |
| COMPARATIVE EXAMPLE 2-3 | 13.5 | 1.6 | 127 | 120 | 952.2 | 358.8 | 54 |
| COMPARATIVE EXAMPLE 2-4 | 13.5 | 1.8 | 951 | 120 | 979.7 | 369.2 | 35 |

TABLE 9

| | STRUCTURE OF ANODE | | | | RATED DISCHARGE CAPACITY (mAh) | RATED ENERGY DENSITY (Wh/l) | DISCHARGE CAPACITY RETENTION RATIO (%) |
| --- | --- | --- | --- | --- | --- | --- | --- |
| | CONTENT OF ANODE ACTIVE MATERIAL WITH THROUGH HOLE (wt %) | VOLUME DENSITY (g/cm³) | LIQUID ABSORPTION TIME (sec.) | TOTAL THICKNESS (μm) | | | |
| EXAMPLE 2-5 | 55.0 | 1.6 | 56 | 120 | 947.5 | 357.1 | 77 |
| EXAMPLE 2-6 | 55.0 | 1.8 | 81 | 120 | 974.9 | 367.4 | 74 |
| COMPARATIVE EXAMPLE 2-5 | 45.0 | 1.6 | 105 | 120 | 946.3 | 356.6 | 68 |
| COMPARATIVE EXAMPLE 2-6 | 45.0 | 1.8 | 427 | 120 | 973.6 | 366.9 | 59 |

The invention claimed is:

1. An electrode, comprising: a mixture layer including a powdered electrode active material, wherein,
   the mixture layer has liquid absorption properties that when 1 μdm³ of propylene carbonate is dropped on the mixture layer at 23° C., a contact angle that the mixture layer forms with a propylene carbonate drop becomes 10 degrees or less within 100 second; and
   at least a portion of the electrode active material has a through hole through a powder, and the content of the electrode active material with the through hole in the mixture layer is at least 50 wt %.

2. An electrode according to claim 1, wherein the average circularity of a shadow of the electrode active material is 0.7 or over.

3. An electrode according to claim 1, wherein the electrode active material has a modulus of volume elasticity of 14 GPa or over, or the electrode active material has a coating with a modulus of volume elasticity of 14 GPa or over in at least a portion of a surface thereof.

4. A battery, comprising: a cathode; an anode; and an electrolyte solution, wherein,
   at least one of the cathode and the anode comprises: a mixture layer including a powdered electrode active material, wherein the mixture layer has liquid absorption properties such that when 1 g dm³ of propylene carbonate is dropped on the mixture layer at 23° C., a contact angle that the mixture layer forms with a propylene carbonate drop becomes 10 degrees or less within 100 second; and
   at least a portion of the electrode active material has a through hole through a powder, and the content of the electrode active material with the through hole in the mixture layer is at least 50 wt %.

5. A battery according to claim 4, wherein the average circularity of a shadow of the electrode active material is 0.7 or over.

6. A battery according to claim 4, wherein the electrode active material has a modulus of volume elasticity of 14 GPa or over, or the electrode active material has a coating with a modulus of volume elasticity of 14 GPa or over in at least a portion of a surface thereof.

7. A battery according to claim 4, wherein a capacity of the anode is represented by the sum of a capacity component by insertion and extraction of light metal and a capacity component by precipitation and dissolution of light metal, and the mixture layer of the anode has liquid absorption properties such that when 1 g dm³ of propylene carbonate is dropped on the mixture layer at 23° C., a contact angle that the mixture layer forms with a propylene carbonate drop becomes 10 degrees or less within 100 seconds.

* * * * *